United States Patent
Vollmer et al.

[11] 3,914,343
[45] Oct. 21, 1975

[54] PHOSPHORIC ACID ESTERS OF 5-(2-AMINO-ETHOXY)-CARVACROLS

[75] Inventors: Karl-Otto Vollmer, Freiburg; Manfred Herrmann, Gundelfingen, both of Germany

[73] Assignee: Warner-Lambert Company, Morris Plains, N.J.

[22] Filed: July 20, 1973

[21] Appl. No.: 381,140

[52] U.S. Cl. ................. 260/945; 260/457; 424/211; 424/303
[51] Int. Cl.² ...................... C07F 9/09; A01N 9/36
[58] Field of Search............................ 260/945, 944

Primary Examiner—Anton H. Sutto
Attorney, Agent, or Firm—Albert H. Graddis; Frank S. Chow; George M. Yahwak

[57] ABSTRACT

The present invention relates to novel sulfuric and phosphoric acid esters of 5-(2-amino-ethoxy)-carvacrol and to the processes for their preparation. These esters have very desirable blood flow increasing activity.

These novel carvacrol derivatives have the following general formula:

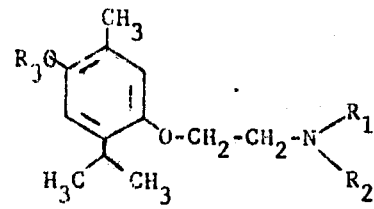

wherein $R_1$ and $R_2$ may be either hydrogen or a methyl, ethyl or other lower alkyl radical, and wherein $R_3$ is phosphoric acid residue, and their pharmaceutically acceptable salts. The carvacrol derivatives formed include compounds in which the radical

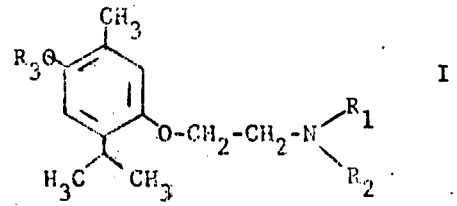

I replaces one or more of the several hydroxy groups on phosphoric acid to yield the corresponding diester or triester as well.

7 Claims, No Drawings

PHOSPHORIC ACID ESTERS OF 5-(2-AMINO-ETHOXY)-CARVACROLS

Of the basically-substituted carvacrol derivatives, [β-(4-acetoxythymoxy)-ethyl]-dimethylamine, generally known as thymoxamine, has been found to have acceptable utility in the treatment of peripheral circulatory disorders.

In an attempt to develop new carvacrol derivatives having improved activity in increasing peripheral blood flow, it has now been found that carvacrol esters of the general formula:

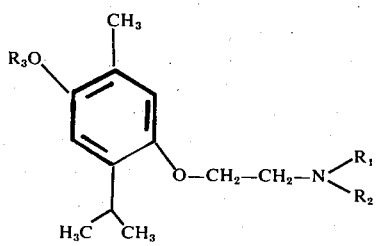

wherein $R_1$ and $R_2$ represent either hydrogen or a methyl, ethyl or other lower alkyl radical, and $R_3$ represents either a sulfuric or phosphoric acid residue, and their pharmaceutically acceptable salts, provide desirably improved peripheral dilating effects. It has further been discovered that these improved effects are also observed in the case of the carvacrol diesters and triesters of phosphoric acid where the phosphoric acid residue is esterified with two or three carvacrol moieties.

The improved peripheral blood flow effects can be demonstrated in both isolated body organ preparations and in laboratory animals such as anesthetized dogs and cats. In anesthetized dogs, for example, a single intravenous dose of 0.5 mg/kg increased blood flow, as measured on an electric-magnetic flowmeter, in the femoral artery by 50 percent for about 30 minutes. Similar effects, i.e., an increase in blood flow of 60 percent, are achieved by an intraduodenal dose of 4 mg/kg.

It has been found that effective therapeutic improvements can be expected after administering dosages of 0.1 to 1.0 mg/kg intravenously, or dosages of 0.8 to 8.0 mg/kg administered peroral.

When employing carvacrols of the following formula which contain a free amino group or a mono-alkyl substituted amino group

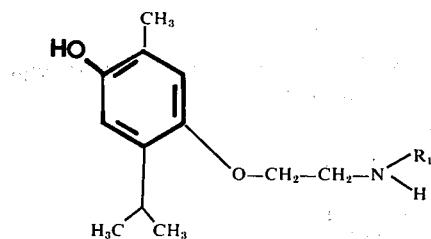

wherein $R_1$ is either hydrogen, or a methyl, ethyl or other lower alkyl radical, these may be obtained from the corresponding dimethylamino compounds described by A. Buzas, et al., Bull. Soc. Chim., France 1959, 839–849; German Pat. No. 905,738; preferably by cyanogen bromide degradation.

The sulfuric acid esters are prepared by known chemical procedures (Houben-Weyl, Vol. 6, No. 2, p. 452) whereby the desired carvacrol compound is reacted with amidosulfonic (sulfamic) acid or chlorosulfonic acid in the presence of tertiary amines, preferably triethylamine, pyridine, or dimethylaniline.

The phosphoric acid esters are prepared by known chemical procedures (Houben-Weyl, Vol. 12, No. 2, p. 143) whereby the desired carvacrol compound is reacted with $POCl_3$ to yield a phosphoric acid ester optionally containing one or two free halides which are subsequently hydrolyzed to form the corresponding phosphoric mono- or diesters.

Pharmaceutically acceptable salts are according to the amphoteric character of the compounds I either sodium, potassium, ammonium, earth alkaline metal salts or salts with pharmaceutically compatible acids such as, e.g. hydrochloric acid, hydrobromic acid, sulfuric acid, phosphoric acid, sulphonic acids, acetic acid, maleic acid, succinic acid, fumaric acid or oxalic acid.

The following are exemplary of the procedures used to obtain the novel carvacrol compounds of this invention:

EXAMPLE 1

5-(2-methylamino-ethoxy)-carvacrol

A solution of 95.3 g (0.34 M) of 5-(2-dimethylamino-ethoxy)-carvacrol in 30 ml benzene is added dropwise with stirring to a solution of 38 g (0.36 M) cyanogen bromide in 80 ml benzene. After heating under reflux for 1.5 hours, the solvent is distilled off in a vacuum, the residue mixed with 150 ml of 2N HCl and the undissolved cyanamide extracted with ether.

The cyanamide is heated under reflux for 14 hours with 1.5 kg of 20% $H_2SO_4$. After cooling, the precipitated thymoxyhydroquinone is filtered off, the remaining by-product is extracted with chloroform and the aqueous phase adjusted to pH 10. The precipitated material is extracted with chloroform and for purification is converted into the hydrochloride salt with ethereal HCl, which is then recrystallized twice from isopropanol/ether. Yield of hydrochloride: 31.2 g (35.2% of theory), M.P. 166°–168°C.

EXAMPLE 2

5-(2-dimethylamino-ethoxy)-carvacryl-hydrogensulfate 23.7g (0.1 M) of 5-(2-dimethylamino-ethoxy)-carvacrol, 31.6 g (0.4 M) of pyridine, and 21.4 g (0.22 M) of amidosulfonic acid are heated to 95°C for 45 minutes with stirring. The excess pyridine is distilled off in a vacuum, the residue dissolved in water, mixed with 15 g of $K_2CO_3$, and extracted with chloroform. The aqueous phase is adjusted to pH 7.5 with 2N $H_2SO_4$. The precipitate is separated by filtration and washed twice with cold water. Yield after recrystallization from water: 20.9 g (66% of theory), M.P. 255°–257°C (dec.).

EXAMPLE 2a 5-(2-dimethylamino-ethoxy)-carvacryl-hydrogensulfate 135 g of 5-(2-dimethylamino-ethoxy)-carvacrol are dissolved in 365 ml of dimethylaniline and mixed with 80 g of chlorosulfonic acid with stirring and cooled with ice. After completing the addition of the chlorosulfonic acid, the mixture is alkalized with aqueous 50% KOH solution, filtered, and the dimethylaniline present is removed by ether extraction. The aqueous phase is then concentrated to 1/3 and adjusted to pH 7.5 with 2N $H_2SO_4$. The precipitate formed is filtered and is washed with cold water. Yield of the above sulfuric acid ester after recrystallization from water is 94.6 g. M.P. 256°–258°C.

EXAMPLE 3

5-(2-methylamino-ethoxy)-carvacryl-hydrogensulfate

A mixture of 19.6 g (87.8 mM) of 5-(2-methylamino-ethoxy)-carvacrol, 18.75 g (87.8 × 2.2 mM) of amidosulfonic acid and 27.8 g (87.8 × 4 mM) of pyridine is stirred and heated to approximately 95°C for 90 minutes. After distilling off the pyridine in a vacuum, the residue is dissolved in water, the solution is alkalized with $K_2CO_3$, the starting material extracted with chloroform and the aqueous phase adjusted to pH 5–6 with 2N $H_2SO_4$. The resultant precipitate is separated by filtration on a suction filter and washed with cold water. Yield of the above sulfuric acid ester after recrystallization from water is 5.8 g (21.5% of theory). M.P. 234°–236°C.

Furthermore, by hydrolysis of the aqueous filtrates (containing mainly N-sulfonic acid) with 2N HCl, together with the above chloroform extract, 76% of the original compound is recovered.

EXAMPLE 4

Phosphoric acid mono-5-(2-dimethylamino-ethoxy)-carvacrylester-dipotassium salt

A solution of 11.9 g (0.05 M) of 5-(2-dimethylamino-ethoxy)-carvacrol in 50 ml of chloroform (free of ethanol) is added dropwise to 30.7 g (0.2 M) of $POCl_3$ and the mixture heated to boiling for 2 hours. Chloroform and excess $POCl_3$ are distilled off, the residue alkalized with $K_2CO_3$, and the alkali-insoluble products removed by ether extraction. The aqueous phase is dried in a vacuum and the reaction product extracted from the residue with ethanol. After filtration, the ethanol is distilled off and the residue, which is the above phosphoric acid ester dipotassium salt, is recrystallized from isopropanol. Yield: 13.4 g (67.9% of theory).

EXAMPLE 5

Phosphoric acid-mono-5-(2-dimethylamino-ethoxy)-carvacrylester 12.4 g of phosphoric acid-mono-5-(2-dimethylamino-ethoxy)-carvacrylester-di-potassium salt are dissolved in water and adjusted with stirring to pH 4 with diluted HCl. The precipitate is separated by filtration and washed chloride-free with cold water. Yield: 8.4 g. M.P. 270°–271°C.

Anal. Calcd.: C 53.0; H, 7.62; N, 4.41; O, 25.2; P, 9.76. Found: C, 53.34; H, 7.51; N, 4.13; O, 25.32; P, 9.63.

EXAMPLE 6

Phosphoric acid-mono-5-(2-dimethylamino-ethoxy)-carvacrylester-mono-Na-salt

Phosphoric acid-mono-5-(2-dimethylamino-ethoxy)-carvacrylester is suspended in water and mixed with a calculated amount of 1N NaOH. The clear solution is dried in a vacuum and the residue recrystallized from 50% aqueous ethanol. The crystallized sodium salt thus obtained contains 3 moles of water of crystallization which is removed by drying at less than 100°C over $P_2O_5$.

EXAMPLE 7

Phosphoric acid-bis-5-(2-dimethylamino-ethoxy)-carvacrylester

A solution of 11.9 g (0.05 M) of 5-(2-dimethylamino-ethoxy)-carvacrol in 30 ml chloroform is added dropwise, with stirring, to a solution of 3.9 g (25.5 mM) of $POCl_3$ in 5 ml of chloroform, and the mixture is heated under reflux for 2 hours. After distilling off the solvent, the residue is mixed with water, alkalized with $K_2CO_3$ and extracted with ether. The aqueous alkaline solution is dried and the potassium salt of the desired product extracted with acetone. The solution is dried again, dissolved in water, adjusted to pH 8 with diluted HCl and dried in a vacuum. The product is extracted from the residue with chloroform. The undissolved material is filtered off, the filtrate concentrated to dryness and, after treatment with acetone, a pure product is obtained with M.P. 187°–189°C. Yield: 10.7 g (80% of theory).

Anal. Calcd.:P, 5.77; Found: P, 5.75.

EXAMPLE 8

Phosphoric acid-tris-5-(2-dimethylamino-ethoxy)-carvacrylester

A solution of 5.1 g of $POCl_3$ (33 mM) in 10 ml of chloroform is added dropwise, with stirring, to a solution of 23.7 g (0.1 M) of 5-(2-dimethylamino-ethoxy)-carvacrol in 120 ml of chloroform (free of water and ethanol) and 5 ml of pyridine. The mixture is heated under reflux for 5 hours. After distilling off the solvent, the residue is mixed with 50 ml of 2N NaOH, stirred, and the pyridine, together with a portion of water, is distilled off in a vacuum. The precipitate is taken up in petroleum ether (fraction 40° to 60°C) and the petroluem ether solution washed several times with 2N NaOH and $H_2O$. After concentrating the solution to dryness, 21.1 g (yield: 83.7% of theory) of a pure, viscous product is obtained. The product is converted to the trihydrochloride salt with ethereal HCl, and the crystalline precipitate is then filtered, washed with ether and dried. It is preferably stored in a desiccator since the hydrochloride salt is very hygroscopic.

Chloride determination: Calculated: 12.3%; Found: 12.4%.

We claim:

1. Phosphoric acid esters of 5-(2-amino-ethoxy)-carvacrols of the formula:

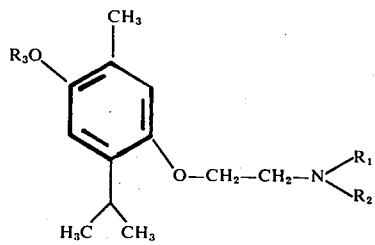

I wherein $R_1$ is selected from the group consisting of hydrogen and lower alkyl radicals and $R_2$ is selected from the group consisting of hydrogen and lower alkyl radicals and $R_3$ is a residue of phosphoric acid selected from the group consisting of:

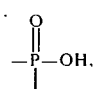

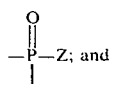

is the carvacrol moiety

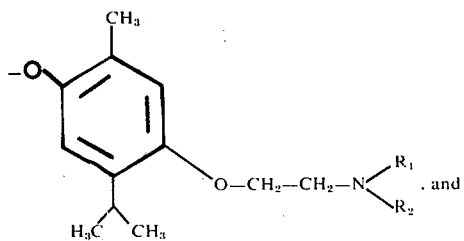

wherein $R_1$ and $R_2$ have the same meaning given above and the pharmaceutically compatible salts thereof.

2. The mono-phosphoric acid ester of claim 1.
3. The di-phosphoric acid ester of claim 1.
4. The tri-phosphoric acid ester of claim 1.
5. The ester according to claim 1 which is phosphoric acidtris-5-(2-dimethylamino-ethoxy)-carvacrylester.
6. The ester according to claim 1 which is phosphoric acidbis-5-(2-dimethylamino-ethoxy)-carvacrylester.
7. The ester according to claim 1 which is phosphoric acidmono-5-(2-dimethylamino-ethoxy)-carvacrylester.

* * * * *